United States Patent [19]
Kuok et al.

[11] Patent Number: 5,259,022
[45] Date of Patent: Nov. 2, 1993

[54] DETECTOR FOR USE WITH AN AUTOMATIC DISCONNECT FEATURE IN A TELEPHONE ANSWERING MACHINE

[75] Inventors: Henry H. Kuok; John H. Livingston, both of Liverpool; Frank D. Jaskulski, Binghamton, all of N.Y.

[73] Assignee: Thomson Consumer Electronics, Inc., Indianapolis, Ind.

[21] Appl. No.: 638,501

[22] Filed: Jan. 7, 1991

[51] Int. Cl.$^5$ .............................................. H04M 1/65
[52] U.S. Cl. ........................................ 379/67; 379/79; 379/81; 379/385
[58] Field of Search ................. 379/79, 81, 385, 395, 379/379

[56] References Cited
U.S. PATENT DOCUMENTS

| | | | |
|---|---|---|---|
| 4,311,879 | 1/1982 | Brush | 379/379 |
| 4,392,023 | 7/1983 | Sears | 379/377 |
| 4,523,056 | 6/1985 | Fisher | 379/372 |
| 4,759,052 | 7/1988 | Hashimoto | 379/79 |

OTHER PUBLICATIONS

Schematic for the GE Model No. 9882 telephone answering machine, manufactured by Thomson Consumer Electronics.

Primary Examiner—James L. Dwyer
Assistant Examiner—Fan Tsang
Attorney, Agent, or Firm—Joseph S. Tripoli; Peter M. Emanuel; Thomas F. Lenihan

[57] ABSTRACT

In a telephone answering machine, a detector for a automatic disconnect function uses a first amplifier to detect, amplify, and invert small input signal changes, and second amplifier to detect large input signal changes and a logic arrangement responsive to the output signals of the first and second amplifiers to detect the presence of only the small input signal changes.

10 Claims, 3 Drawing Sheets

DETECTOR FOR USE WITH AN AUTOMATIC DISCONNECT FEATURE IN A TELEPHONE ANSWERING MACHINE

FIELD OF THE INVENTION

The subject application generally concerns the field of telephone answering machines, and specifically concerns telephone answering machines having an automatic disconnect feature.

BACKGROUND OF THE INVENTION

Telephone answering machines employing tape recorders for playing an outgoing "hello" message (i.e., outgoing announcement or OGA), and for recording incoming messages, are now commonly available. In operation, when the telephone answering machine answers an incoming call, it plays the "hello" message, emits a "beep" tone, and records an incoming message onto the tape. It sometimes happens that the called-party is at home and desires to answer the telephone call himself rather than let the telephone answering machine answer the call. In such a case, it is desirable that the outgoing announcement be automatically terminated in response to the lifting of the receiver of an extension telephone, rather than forcing the user to wait until the outgoing announcement finishes. Such a system requires an automatic disconnect feature including a detector circuit to detect the "off-hook" condition of the extension telephone. A telephone answering machine having an automatic disconnect feature, and including an "off-hook" detector is known from the GE telephone answering machine model number 9882 manufactured by Thomson Consumer Electronics, Inc. Indianapolis, Ind. The answering machine model number 9882 was manufactured and sold to the public on or about May 1, 1989, and a manual describing the unit was published at the same time, on or about 5/1/89.

In these, and in similar, telephone answering machines, the detector can be "fooled" into terminating the outgoing announcement and disabling the recording feature by misinterpreting other signal conditions on the telephone line as extension "off-hook" conditions. Some of the falsely interpreted signal conditions are: a pulse indicative of "call-waiting", momentary loop instability during the first few seconds of the call, and call termination by the calling party (i.e., if the calling party hangs-up, the time and date message may not be added to the tape).

The extension telephone off-hook detector must be made very sensitive in order to detect the small changes in telephone line voltage which are indicative of an off-hook extension telephone. Unfortunately, the three often-misinterpreted telephone signal conditions (i.e., loop interruptions) set forth above cause relatively large changes in telephone line voltage. There has clearly been a long-felt need for a reliable solution to the problem of detecting the small signal change caused by the off-hook extension telephone, while not detecting the large loop voltage changes caused by the above-noted telephone line signal conditions. The above-noted GE telephone answering machine model number 9882 includes a manually-operable switch for disabling the automatic disconnect feature in the event that false detection of telephone line signal conditions occurs frequently enough to become an annoyance.

SUMMARY OF THE INVENTION

In a telephone answering machine, a detector for a automatic disconnect function uses a first amplifier to detect, amplify, and invert small input signal changes, and second amplifier to detect large input signal changes and a logic arrangement responsive to the output signals of the first and second amplifiers to detect the presence of only the small input signal changes.

DETAILED DESCRIPTION OF THE EMBODIMENT

Figure 1:
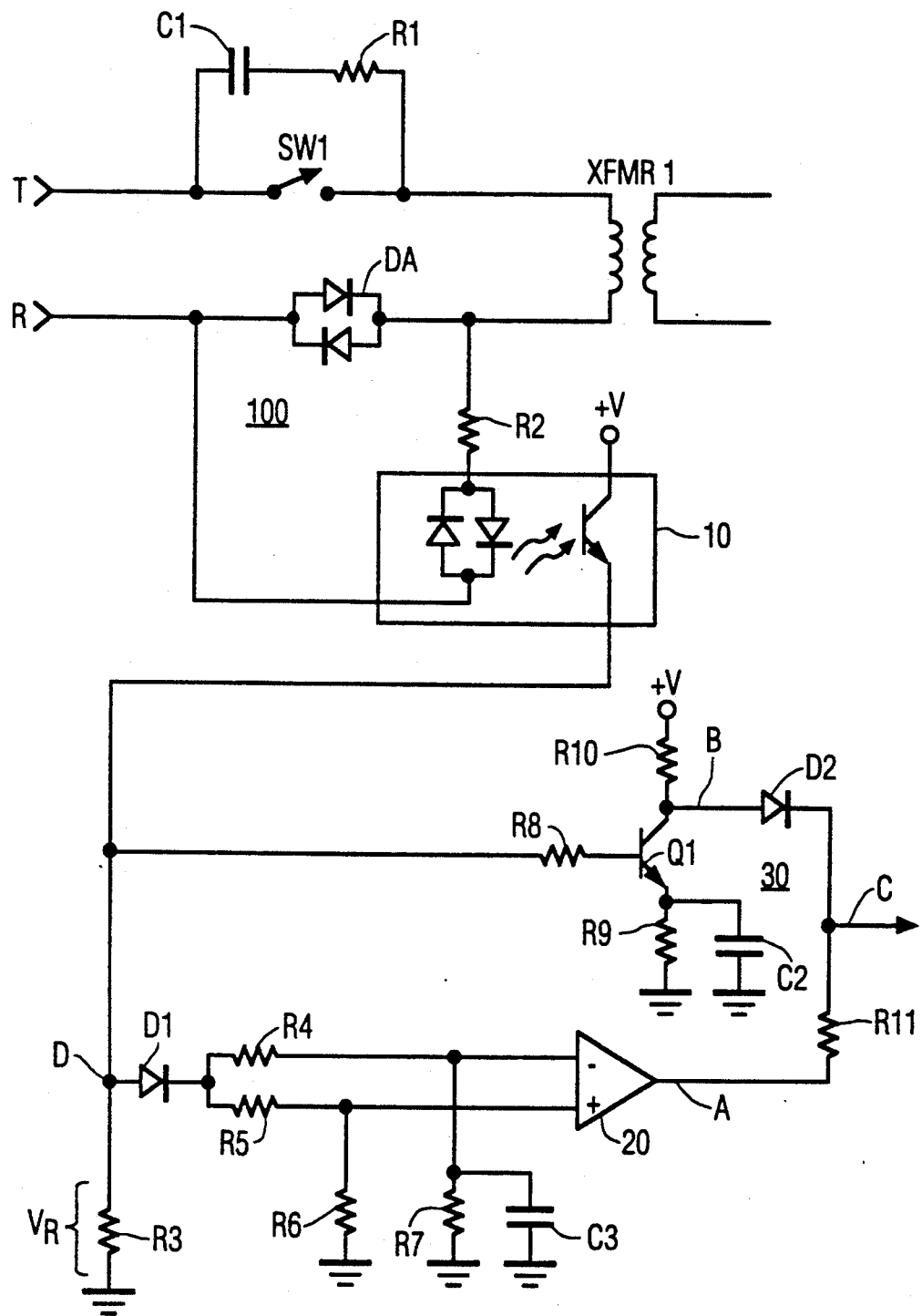
FIG. 1 shows, in schematic form, a detector circuit in accordance with the subject invention.

The subject invention will be described with reference to FIGS. 1 and 2. FIG. 1 shows a portion of an interface circuit for connecting a device such as a telephone answering machine to a pair of telephone lines. The connection to the telephone lines is made at terminals T (tip) and R (ring). A hook switch SW1 is shown in the on-hook (i.e., open) position. In a telephone, hook switch SW1, is positioned in the cradle, and closes when the receiver is lifted from the cradle, thus connecting the telephone unit to the telephone line. In an answering machine, hook switch SW1 may be a solid state switch or a set of relay contacts for automatic operation by a controller. A high pass network comprising a capacitor C1 and a resistor R1 couples the ringer signal around the normally open switch contacts of hook switch SW1. A transformer XFMR 1 couples audio signals and provides isolation between the telephone line and the answering machine.

When hook switch SW1 is closed, a current mirror circuit generally designated 100, comprising a diode array DA, a resistor R2, an opto-isolator unit 10 and a resistor R3, induces a current through resistor R3 which is substantially the same as (i.e., mirrors) the current flowing through the primary winding of transformer XFMR 1. Note that opto-isolator unit 10 is operated in a linear mode, instead of being operated in the usual nonlinear fashion.

When hook switch SW1 is open, only a small reference voltage appears across resistor R3 at circuit point D. This condition is illustrated in the uppermost waveform of FIG. 2 (labelled D) during the period labelled I. When hook switch SW1 is closed, the current through R3 is increased and the voltage across it appears as in waveform D during period II. A loop interruption such a a pulse indicative of "call waiting" is illustrated in waveform D in period III. When a extension telephone is picked up, slightly less current is conducted by current mirror 100, with the result that a slightly lower voltage appears across resistor R3, as shown in waveform D in period IV. As noted above, the task is to reliably detect the waveform of period IV and ignore the waveform of period III.

Current mirror circuit 100 and a differential amplifier circuit arrangement comprising amplifier 20 resistors R4, R5, R6, and R7, and a capacitor C3 are known from the above-mentioned GE model 9882 telephone answering machine. Voltage dividers R4, R7 and R5, R6 are arranged to provide a slight voltage offset between the two input terminals of amplifier 20 in order to prevent oscillation. Capacitor C3 integrates any voltage changes which may appear at the inverting terminal of amplifier 20 with the result the negative-going changes appearing at the noninverting terminal cause the output signal of amplifier 20 to quickly change states from fully low to fully high (as shown in waveform A of FIG. 2). Note that amplifier 20 is sensitive enough to produce a full range signal for even the small input voltage change of period IV. During low voltage signal conditions, a diode D1 isolates amplifier 20 from the input circuit of a second amplifier generally designated 30.

Amplifier 30 comprises a transistor Q1, biasing resistors R8, R9, and R10, and a capacitor C2. Resistor R9 and capacitor C2 set a switching threshold level for amplifier 30. When the voltage at circuit point D (i.e., the input side of resistor R8) decreases, the current through R8 decreases removing bias from transistor Q1. The output signal of transistor Q1 will rapidly switch to the opposite state if the above-mentioned threshold level is traversed. This operation is shown in waveform B of FIG. 2 during period III. If, however, the decreasing input signal does not cause the switching threshold level to be traversed, then no change will be caused at the output. This operation is shown in waveform B of FIG. 2 during period IV.

We have now described a first output signal (i.e., A) which responds to both large and small input signal changes, and a second output signal (i.e., B) which responds to only large input signal changes. It is now only necessary to devise the proper digital logic to provide the desired output signal which is indicative of only small input signal changes. Diode D2 and resistor R11 provide the necessary logical OR function. Perhaps in this case, the function is easier to understand if one considers the function to be a negative logic AND function (i.e., a low output is produced only if two low level signals are input to the gate). The truth table for such a gate is shown as follows.

| Input signal D | A | B | C | |
|---|---|---|---|---|
| L | L | H | H | CASE 1 |
| H | H | L | H | CASE 2 |
| L | L | H | H | CASE 3 |
| H | L | L | L | CASE 4 |

Figure 2:
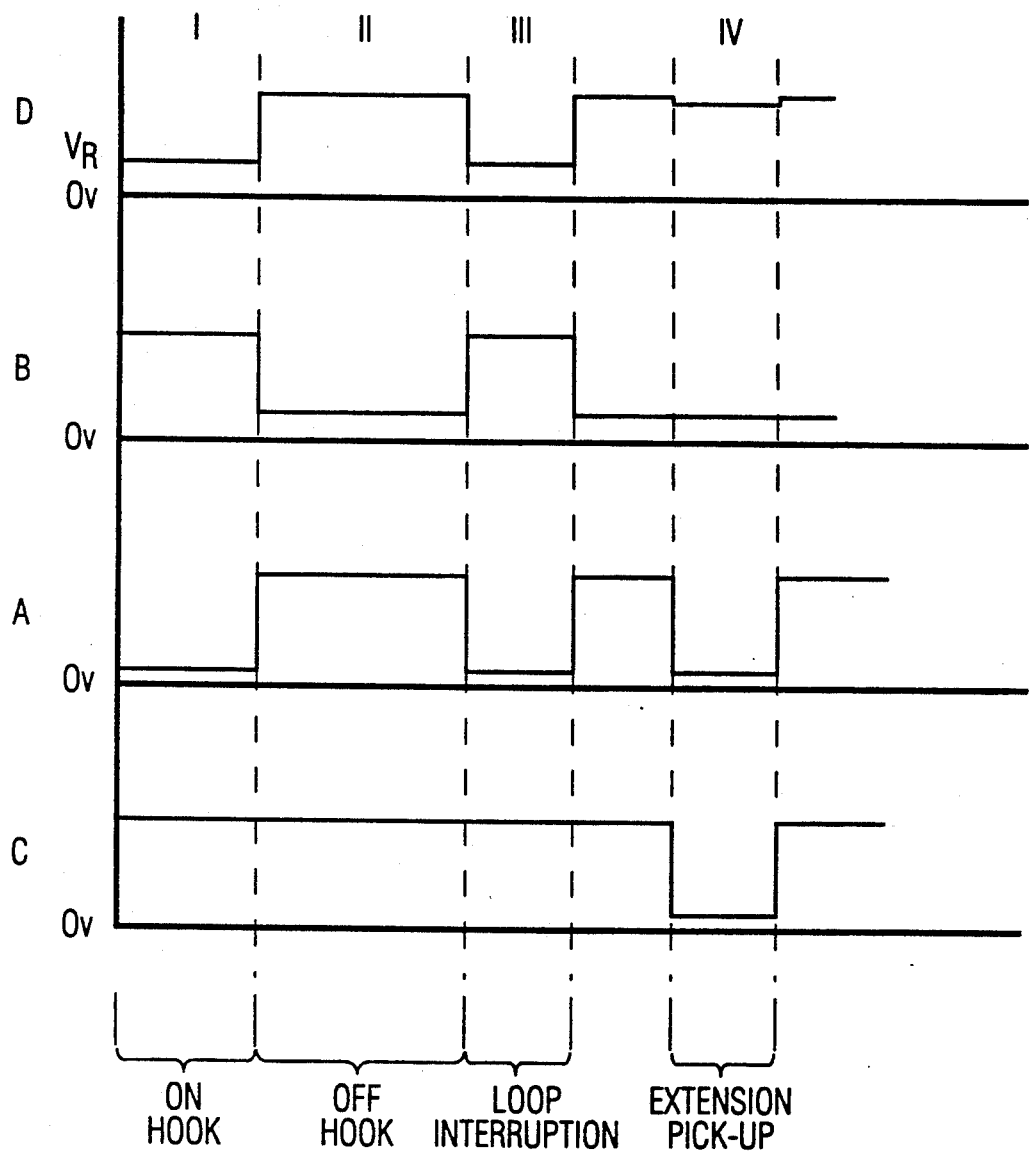
FIG. 2 shows waveforms helpful for understanding the invention.

Cases 1-4 correspond to periods I-IV of FIG. 2. Note that waveform B does not respond to the small input signal change during period IV and remains at a low level, and waveform A does respond to the small input signal change during period IV. The logical OR (or negative logic AND) of waveforms A and B produce waveform C which goes low only during period IV. Thus, a reliable detector for detecting small input signal changes which may be interspersed with large input signal changes has been described.

Typical values for the components of FIG. 1 are as follows:

| R1 | 22 kilohms | R2 | 1.5 kilohms | R3 | 5.1 kilohms |
|---|---|---|---|---|---|
| R4 | 1 kilohm | R5 | 1 kilohm | R6 | 5.1 kilohms |
| R7 | 4.75 kilohms | R8 | 4.7 kilohms | R9 | 30 ohms |
| R10 | 200 ohms | R11 | 1 kilohm | C1 | 1 microfarad |
| C2 | 100 micro- | | | C3 | 100 mico- farads |

Figure 3:
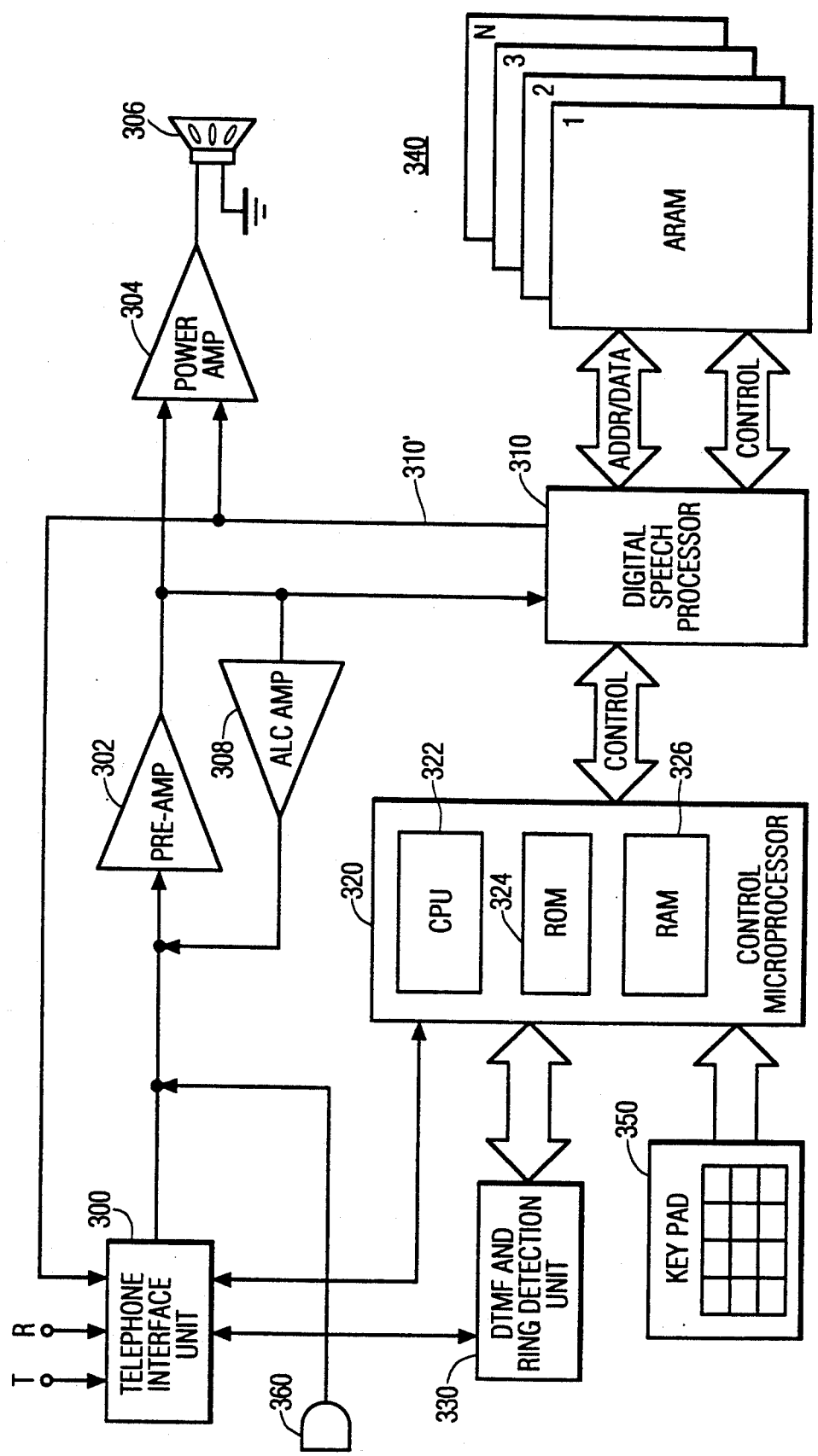
FIG. 3 shows, in block diagram form, a telephone answering machine incorporating the subject invention.

While a telephone answering system employing ARAM (audio RAM) units is shown in FIG. 3, the present invention is unconcerned with the storage medium and will perform equally well with telephone answering machines employing audio tape recording circuitry. A telephone interface unit 300 is coupled to the telephone network via lines T (tip) and R (ring). Telephone interface circuitry suitable for use in telephone interface unit 300 has already been described with respect to FIG. 1. Telephone interface unit 300 couples received audio signals to an audio pre-amplifier unit 302 which is gain-controlled by an Automatic Level Control (ALC) amplifier 308. The amplified audio signals are applied to a Power Amplifier 304 for reproduction in a speaker unit 306. Amplified audio signals produced by preamplifier unit 302 are also applied to a Digital Speech Processor unit 310 for sampling and conversion into a digital representation of the received audio signal. The digitized audio signals are stored, under control of digital speech processor unit 310, in an array of ARAM units generally designated 340, and individually numbered 1-N.

Digital speech processor unit 310 is, in turn, controlled by a controller 320. Controller 320 may be a microcomputer, a microprocessor, or a custom integrated circuit. Controller 320 includes a CPU 322, program ROM array 324, and an internal RAM array 326. Controller 320 receives input from an external keypad 350, and communicates bidirectionally over the telephone network via a DTMF AND RING DETECTION unit 330. The initials DTMF are known to those skilled in the telephone art to mean Dual Tone Multi Frequency, and signify a method for encoding digits into a dual tone signal. Ring detection is also accomplished by unit 330 which passes ring information to controller 320. A microphone 360 provides an alternate source of audio signals to the system, and is used for entering the "hello" message which the answering machine automatically delivers after answering incoming telephone calls.

Note that the apparatus of FIG. 3 does not include a tape recorder mechanism, or tape recording electronics. All messages, whether incoming or outgoing, are stored in ARAM array 340 in digitized form. In operation, controller 320, upon detecting a ring signal via DTMF AND RING DETECTION UNIT 330, controls digital speech processor unit 310 to read data corresponding to a previously stored "hello" message from ARAM array 340, to convert the digital data to analog form, and to apply the converted analog signal to telephone interface unit 300 via a wire 310'. Thereafter, controller 320 controls digital speech processor 310 to convert the incoming message to digital form and store the resulting data in an incoming message storage area of ARAM array 340.

What is claimed is:

1. In a telephone system, signal detection circuitry comprising:
an input terminal for receiving input signals exhibiting first, second and third signal levels; said first signal level being indicative of an on-the-hook condition; said third level being indicative of an off-the-hook condition and said second level being indicative of a phone extension being taken off-thehook when an off-the-hook condition already exists and said second level being intermediate said first and third levels; and wherein the difference between said first level and either said second and third levels corresponds to a relatively large voltage change and the difference between said second and third levels corresponds to a relatively small voltage change;

first amplifying means coupled to said input terminal for sensing any change in level at said input terminal and in response thereto producing a first output signal indicative of any change in said levels;

second amplifying means coupled to said input terminal for sensing large changes at said input terminal and producing a second output signal having either a first value in response to a large change in level or a second value in response to a small change examplified by a transition between the third level and the second level; and means coupled to the first and second amplifying means and responsive to the presence of said first output signal and to said second output signal having said second value for producing a third output signal indicative of said phone extension being taken off-the-hook.

2. The circuit of claim 1 wherein said first amplifier means is a differential amplifier.

3. The circuit of claim 2 wherein said second amplifier means includes threshold level setting means.

4. The circuit of claim 1 further including an opto-isolator circuit biased to operate in a linear mode.

5. In combination with the telephone system as claimed in claim 1, wherein said telephone system includes a pair of telephone lines and wherein said signal detection circuitry includes a current mirror for sensing the signal current in the telephone line and an opto-isolator for electricaly isolating but optically coupling the signal current to said input terminal.

6. An automatic disconnect detection system for a telephone answering machine, comprising:

an input terminal for receiving input signals exhibiting first, second and third signal levels; said first signal level being indicative of an on-the-hook condition; said third level being indicative of an off-the-hook condition and said second level being indicative of a phone extension being taken off-the-hook when an off-the-hook condition already exists and said second level being intermediate said first and third levels and wherein the difference between said first level and either said second and third levels corresponding to a relatively large voltage change while the difference between said second and third levels corresponding to a relatively small voltage change;

first amplifying means coupled to said input terminal for sensing any change in said levels and in response thereto, producing a first output signal indicative of any change in said levels;

second amplifying means coupled to said input terminal for sensing large changes in levels at said input terminal and producing a second output signal having either a first value in response to a large change as examplified by transition from said first to said third level or having a second value in response to a small change as examplified by a transition between said second and third levels; and means coupled to the first and second amplifying means and responsive to the first and second output signals for producing a disconnect signal in response to said first output signal indicating the occurrence of any change and said second output signal having said second value.

7. The circuit of claim 6 wherein said first amplifier means is a differential amplifier.

8. The circuit of claim 7 wherein said second amplifier means includes threshold level setting means.

9. The circuit of claim 6 further including an opto-isolator circuit biased to operate in a linear mode.

10. In a telephone system which includes:

an input terminal for receiving input signals exhibiting first, second and third signal levels; said first signal level being indicative of an on-the-hook condition; said third level being indicative of an off-the-hook condition and said second level being indicative of a phone extension being taken off-the-hook when an off-the-hook condition already exists and said second level being intermediate said first and third levels and wherein a transition between said first level and either said second and third levels produces a relatively large voltage change while a transition between said second and third levels produces a relatively small voltage change;

means for sensing said phone extension being taken off-the-hook comprising:

first amplifying means coupled to said input terminal for sensing small and large changes in said levels at said input terminal and producing a first output signal indicative of any change in said levels;

second amplifying means coupled to said input terminal and responsive to the voltage levels thereat for producing a second output signal having either a first value in response to any transition from said second and third level to said first level or a second value in response to a transition between said third and second level; and means coupled to the first and second amplifying means and responsive to the first and second output signals for producing a third output signal when said first output signal indicates the occurrence of any change and said second output signal has said second value.

* * * * *